Figure 1:
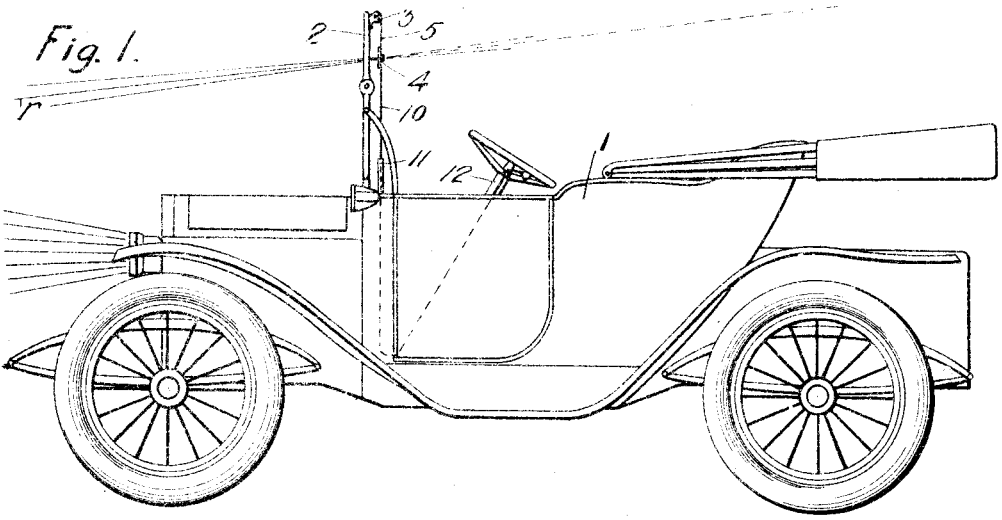

W. J. PERKINS.
LIGHT FOCUS INTERCEPTING SHADE.
APPLICATION FILED AUG. 19, 1912.

1,109,013.

Patented Sept. 1, 1914.

3 SHEETS—SHEET 1.

WITNESSES:

INVENTOR.
Willis J. Perkins
BY
Frank E. Liveramore
ATTORNEY.

W. J. PERKINS.
LIGHT FOCUS INTERCEPTING SHADE.
APPLICATION FILED AUG. 19, 1912.
1,109,013.
Patented Sept. 1, 1914.
3 SHEETS—SHEET 2.
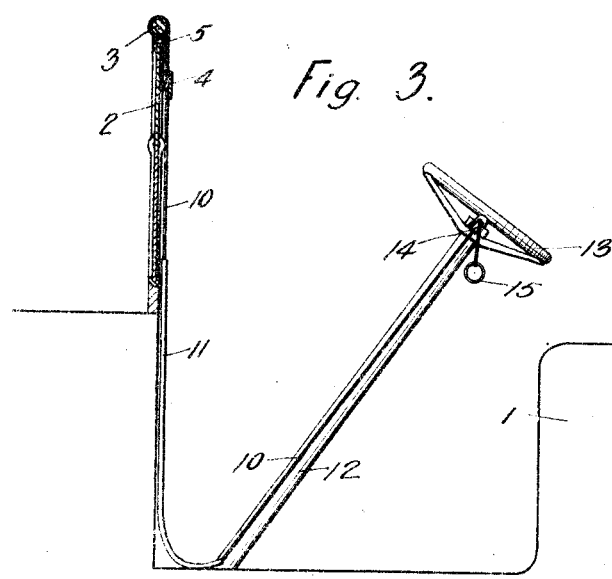
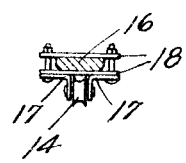
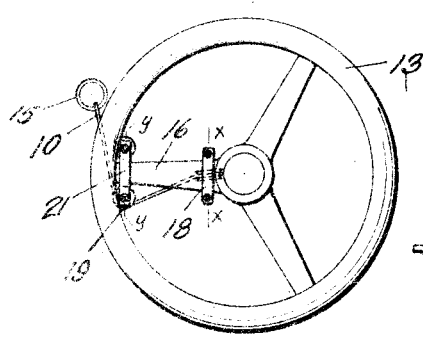
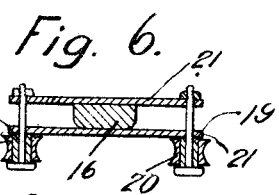
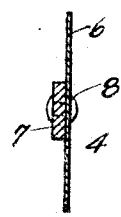
WITNESSES.
INVENTOR.
Willis J. Perkins
BY
Frank E. Liurance, Jr.
ATTORNEY.

W. J. PERKINS.
LIGHT FOCUS INTERCEPTING SHADE.
APPLICATION FILED AUG. 19, 1912.
1,109,013.
Patented Sept. 1, 1914.
3 SHEETS—SHEET 3.
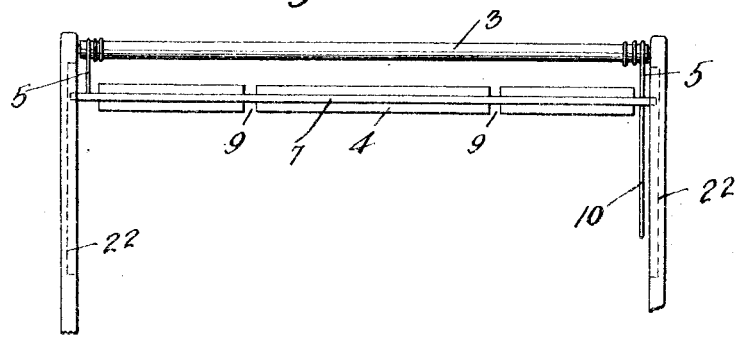
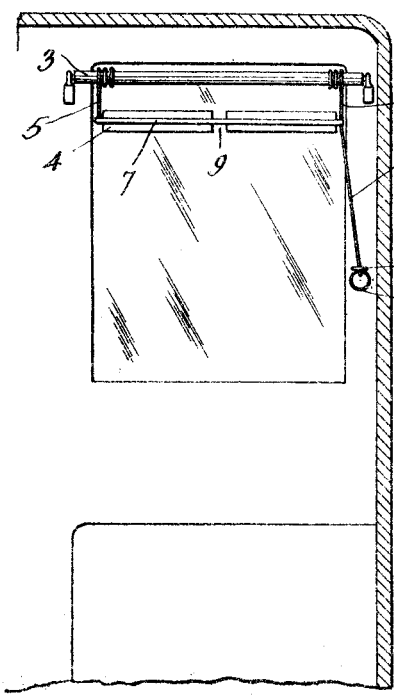
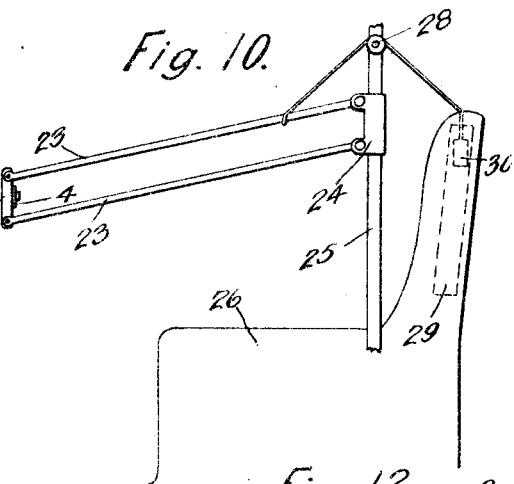
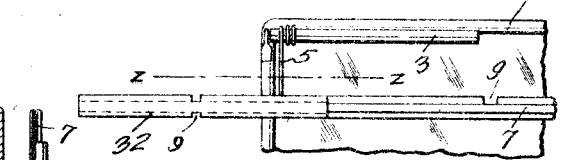
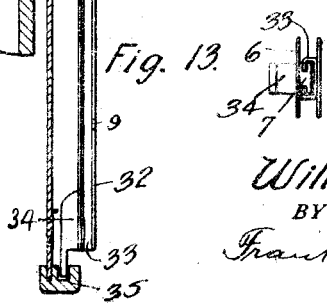
WITNESSES.
INVENTOR.
Willis J. Perkins.
BY
Frank E. Liuriauce, Jr.
ATTORNEY.

UNITED STATES PATENT OFFICE.

WILLIS J. PERKINS, OF GRAND RAPIDS, MICHIGAN.

LIGHT-FOCUS-INTERCEPTING SHADE.

1,109,013.  Specification of Letters Patent.  Patented Sept. 1, 1914.

Application filed August 19, 1912. Serial No. 715,868.

*To all whom it may concern:*

Be it known that I, WILLIS J. PERKINS, a citizen of the United States, and resident of Grand Rapids, in the county of Kent and State of Michigan, have invented a new and useful Improvement in Light-Focus-Intercepting Shades, of which the following, taken in connection with the accompanying drawings, is a specification.
My invention has relation to and is of utility in connection with vehicles of transportation on land or water or in the air, that are guided and controlled in their movements, either as to direction or speed, or both, by a driver or pilot or other attendant. And it has particular reference to the safety convenience and protection of the vehicle, its attendant, occupants or passengers, and of other vehicles or pedestrians whenever artificial light service is required, as at night or in a fog, or when the sunlight may interfere with the vision of the attendant, by lessening the liability of collision or other accident on account of confusion of the attendant due to dazzling or blinding lights coming within his range of vision.

As is well known, powerful and brilliant search lights or headlights are carried by vehicles of transportation of all types, whether for land, water or air service, and when the lights carried by any such vehicle become focused within the range of vision of the attendants of other vehicles, such person may become blinded and confused thereby, and cannot see where the vehicle is going, endangering not only the vehicle driven and its occupants but also other vehicles or pedestrians with which collision may be had. The same is also true when the sun is near the horizon so that it may shine directly in the eyes of the attendant.

It is an object of my invention, primarily, to provide a means of eliminating, screening, cutting out or softening the rays of light which otherwise would dazzle the attendant as they are encountered, securing the safety and comfort of the occupants of such vehicles of transportation, thereby.

A further object of my invention is to provide a light intercepting shade and mount it in such manner that, normally, it is out of the way and not noticeable, yet is subject to manual operation by means of the hand, leg or foot so as to serve its shading and screening functions when desired.

A still further object is to provide a light focus intercepting shade of such construction that while it protects the attendant and others from the focal glare or light encountered when in its abnormal position, does not cut off the view but allows visual outlook over and under the same, or through observation spaces in the shade made either by cutting out portions thereof, or by forming transparent sections therein, thus permitting the line of travel of the vehicle to be clearly seen.

Still other objects and purposes will be apparent as the description of the device shown in the drawings progresses, the drawings showing practical and preferred embodiments, though it is not attempted to show all the constructions that have occurred to me in reducing my invention to practical form.
For a clear understanding of the invention, reference may be had to the accompanying drawings, in which—

Figure 2:
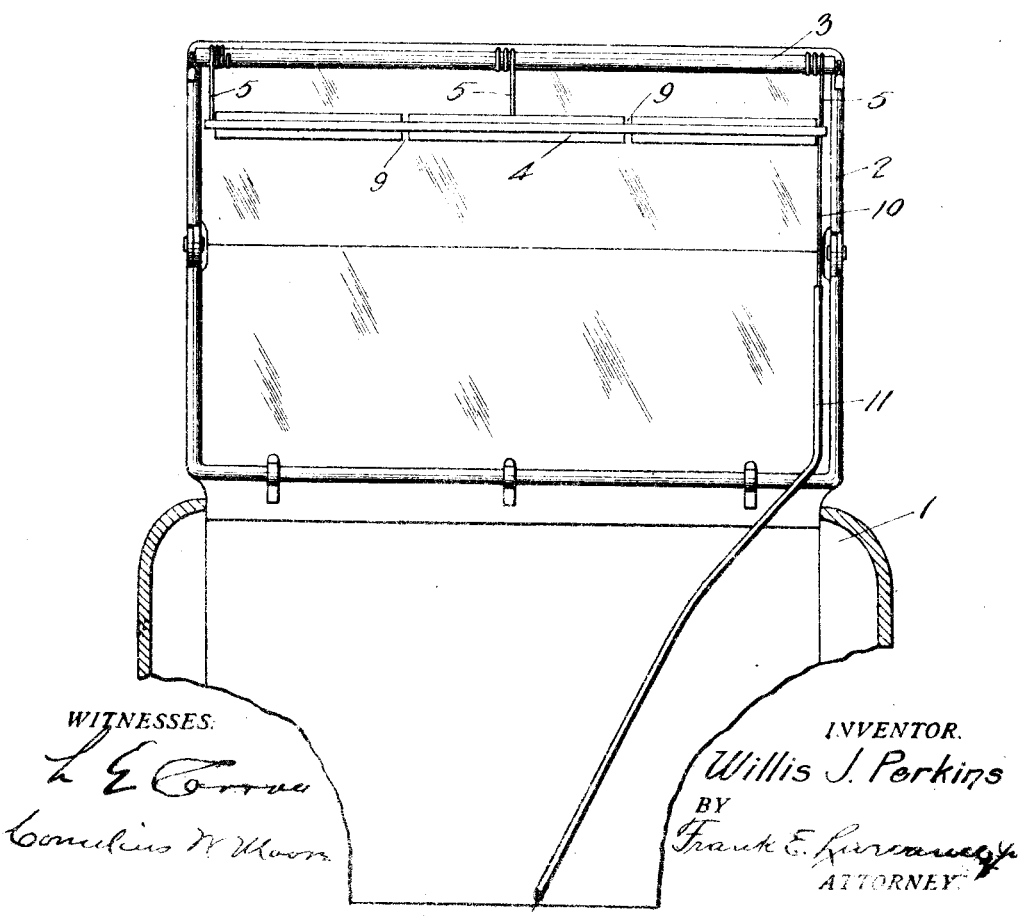

Figure 1 is a side elevation of an automobile with my invention applied thereto, and supported from the wind shield thereof. Fig. 2 is a view from behind the wind shield showing the shade in front elevation and one method of mounting it on the wind shield. Fig. 3 is a side view partly in section of my invention, disclosing a preferred means of manually operating the shade. Fig. 4 is a plan view of a steering wheel showing the operating means for shifting the intercepting shade attached thereto.
Figs. 5 and 6 are sectional views taken, respectively, on the lines $x$—$x$, and $y$—$y$, Fig. 4. Figs. 7 and 8 are, respectively, a transverse sectional view and a top view of the shade. Figs. 9 and 10 are modified forms of structure embodying the invention. Fig. 11 shows an application of the invention to a locomotive or other vehicle having a cab or housing for the pilot thereof. Fig. 12 is a front elevation of a modified form of shade as applied to the wind shield of an automobile. Fig. 13 is a section on line $z$—$z$, Fig. 12, with the shade extension in retracted position. Fig. 14 is an end view of the modified form of shade shown in Figs. 12 and 13.

Similar reference numerals refer to similar parts throughout the several views.

In the preferred embodiment of my invention as shown, there is provided as the vehicle of transportation, an automobile 1, having the usual windshield 2. At the upper edge of the shield a spring roller 3 is mounted, either to one side of the shield as shown in Figs. 1 and 2, or above it as shown in Fig. 3. The light focus intercepting shade 4 is supported from the roller by means of a plurality of flexible connections 5, three of which are shown, though obviously, the number may be varied at will. The tendency of the roller is to wind up the flexible connections 5, elevating the shade 4 to a position which it normally occupies in close proximity to the roller. I have used the spring roller as a ready and convenient elevating or retracting means but any other equivalent means may be used so long as it accomplishes the result of normally drawing the shade away from the line of vision of the driver. The intercepting shade 4 comprises in its construction, a long, thin and narrow member 6, preferably of semi-transparent material and of sufficient strength and rigidity to be serviceable, or it may be backed by a strip 7 of wood or other suitable material, attachment being made by means of the rivets 8. The material used in providing the semitransparent member 6 may be any best suited for the purpose, and in practice, I have used celluloid having a tinge or color such that it will intercept certain of the rays of light coming from exterior white lights. It is well known that celluloid of the ordinary market type has a yellowish or amber-like color which makes it a good intercepting medium for certain of the rays coming from white lights, especially those rays which have the shortest wave length and which are the cause of the blinding and confusion of vision when permitted to enter the eye. Rays of greater wave length are not thus intercepted, and red or green rays freely pass. This is of especial value when my invention is used with locomotives, electric cars, and with water vehicles, where the red and green signal lights must be clearly seen. Such material accordingly serves as a partial screen for the passage of certain unobjectionable rays but intercepting those which are objectionable on account of their blinding qualities. As shown the ends of strip 7 extend a short distance beyond the ends of the member 6 affording projections to which the flexible connections 5 may be attached. The semi-transparent member 6 is provided at intervals with observation spaces or openings 9, formed either by cutting away a portion of the member 6, or by providing transparent sections in the member 6 at the desired places. The shade extends across and nearly the full width of the wind shield as shown though its length may be varied at will to suit different conditions and the observation spaces may be located in the shade and may be provided in number to suit the convenience and desires of the attendant so as to produce the most satisfactory results.

To control the movements of the intercepting shade, a suitable flexible connecting means 10 is attached thereto, and leads down into and through a guiding tube or conduit 11, which is attached and held firmly in position and is bent and shaped so as to carry the flexible connection to the foot and in close proximity to the steering post 12. Other suitable guiding means obviously may be used to carry the flexible connection. The flexible connecting device 11 extends to the top of the steering post to the steering wheel 13, and is guided over the small roller 14, terminating at its free end in a suitable operating means such as the ring 15, or its equivalent. The pulley is mounted on an arm 16 of the steering wheel and close to the post 12 by means of the brackets 17 and clamp bars 18 as shown in Fig. 5. At the outer end of the arm 16 and near the rim of the wheel, one or more take-up rollers 19 are mounted, turning freely on suitable journals 20, which are supported from the bars 21 as shown in Fig. 6, and located some distance apart to suitably space the rollers from each other. These rollers 19 serve to carry and guide the flexible connection 10 and change its direction of movement when it is manually operated to shift the shade 4, so that the hand operating the flexible connection 10 need not be taken from the wheel or shifted materially along the rim of the wheel.

The operation and utility of the construction described will be readily apparent. When it is desired to shade the eyes from the focal glare of an exterior light the operator takes hold of the terminal enlargement to the member 10, in this case the ring 15, and by pulling thereon, shifts the shade 4 from its normal position to such position before the eyes that it intercepts the rays of light that would ordinarily freely enter and blind or confuse the operator. I have indicated this operation in Fig. 1, the ray r being intercepted by the shade so as not to pass farther and along its usual path as indicated by the dotted line extension. The shade is adjusted to suit the distance the light may be away and its position vertically with respect to the driver or attendant, and as these factors vary, the adjustment of the shade may be correspondingly varied. It is obvious, as the shade is compartively close to the eyes of the attendant in comparison to the distance that it is from the exterior light, that a very narrow shading section will serve to intercept and cut out the light focus or center of light which furnishes the direct and blinding rays from high power lights. And with this narrow shade provided, the attendant can be insured against receiving such rays and at the same time can have visual outlook over and under the shade. The observation spaces are of utility in aiding this outlook, as vision may be had therethrough, yet the eyes be protected from the exterior lights by the shading portions at the sides of the observation spaces, a slight horizontal shift of the eyes to proper position to accomplish this result being all that is required.

In the normal retracted position of the light focus intercepting shade, the ring 15 will be between the roller 14 and the periphery of the wheel 13. Upon operating the shade into intercepting position, the flexible operating connection 10 will be drawn outward and in order that in operating the same the hand need not be removed from the steering wheel, I have provided the take-up rollers 19, so that the flexible connection 10 may be turned and its direction of movement changed so that when the shade is shifted to a considerable degree, the controlling hand need be moved but slightly along the rim of the wheel. This operation is fully shown in Fig. 4. I have shown two rollers 19, which number, however, may be varied. With the construction shown, the hand may be moved in either direction along the wheel, by guiding the connection 10 around either roller, or if the screen is shifted a considerable distance, the connection 10 may be wrapped about both rollers thereby limiting the movement of the hand that controls the shade and requiring but small displacement thereof from its normal position on the wheel.

While I have heretofore described the light focus intercepting shade as applied to an automobile and as supported on the wind shield thereof, it is of course obvious that it is not limited to such specific application. In Fig. 9 there is shown a modification which may be applied to vehicles of transportation not having wind shields, whether automobiles, or vehicles drawn by horses, or other carriers. A pair of upright stanchions 22 carry the spring roller 3 and the shade 4, and such stanchions take the place of the wind shield as a support therefor. As there would be considerable wind pressure tending to force the shade backward upon rapid movement of the vehicle, I have extended the ends of the strip 7 to pass into grooves in the stanchions 22, to overcome such tendency.

In Fig. 10 I have shown a still further modification, use being made of the well known parallel link movement. A pair of parallel arms 23 are pivotally mounted on the vertically adjustable sleeve 24, which sleeve is positioned on the upright 25, located along the side of the seat 26. This upright may be one of the supporting standards carrying the top over the seat 26 or it may be supported from any suitable point of vantage and be used only to support the light shade. At the outer ends of the parallel arms 23 they are connected by a link 27 parallel to the uprights 25. A flexible connection attached to the upper arm 23 and passing over roller 28 mounted on upright 25, leads into the recess 29 in the seat back and has attached to its end the weight 30. The tendency of the weight is to lift the arms 23 and link 27. With one of such parallel link structures mounted at each end of the seat, and the shade 4 extending between and supported in position by the links 27, there is provided a practical working device equivalent in function to the other embodiment described. One desiring to screen the eyes from an exterior light may grasp the lower arm 23 and draw the intercepting shade down to the desired position. When the light has removed from visual range, the arm may be released upon which the shade will be automatically retracted to normal position. Other equivalent means of operation will readily occur to those skilled in the mechanic arts.

In Fig. 11, I have shown an application of my invention to the cab of a locomotive, and the same may be applied in like manner to the pilot house of a water going vessel or to an aeroplane. The roller 3 and shade 4 are applied at the look-out window of the cab or pilot house, and the flexible connection 10 that serves to control the shade movement engages with a stop means 31 against which the ring 15 normally is drawn. The engineer on meeting a train, or in passing through cities where bright lights are liable to confuse and inconvenience him, or when facing the sun, will shift the shade in the usual manner to intercept such lights. It is especially to be desired that an engineer shall be able to see when entering and passing through cities as in such crowded centers accidents are most liable to happen. The pilot of a water going vessel will also be benefited in like manner as will be readily understood.

There are many vehicles, especially among automobiles, in which the driver is at the left side, and the view ahead is more likely to be to the side of the wind shield than through it. In such case, a shade extending only within the confines of the wind shield would be of little or no service. It is to provide for this contingency that I have designed the modification shown in Figs. 12, 13 and 14. In effect it consists in adding an extension to the usual shade of the type already described which projects to the left beyond the outer edge of the wind shield but which is capable of being retracted to within the confines of the wind shield. And here it may be noted that in all instances whether with a right or left hand drive, the service portion or zone of the shield which is of utility in aiding the driver is located to one side of the direct line of vision of the driver ahead, that is, it is located to that side on which approaching vehicles carrying lights, or of objects which are met in the course of travel must pass. In this country the law of the road is that a vehicle must turn to the right and, accordingly, the service zone must be to the left of the driver. If, however, in any state or in foreign countries the rule is different, the service zone must be on the other side. In any event it is imperative that the driver be protected from objects passing on the legally required side and it is for this purpose that I provide the extension for the left hand side drive. And while I have shown the shade member as extending across the full width of the wind shield, it is clear that it is so constructed merely for the purpose of extending it to the side of the wind shield where the supporting cord would be most inconspicuous. So that in its essence the invention consists in supplying the shade in such relation to the driver that when he is operating the car his vision ahead will not be obstructed to any appreciable extent such that he cannot avoid it by a slight movement of his head while glaring lights to the side on which light carrying vehicles must pass will be shaded and his eyes protected from the glare by reason of the laterally extending service zone of the shade. Therefore I have supplied this extension for use in case of left hand side drives and which may be made in a variety of ways but as I have shown it, it has sliding engagement with the main shade member 4, and may be manually positioned with reference to the main shade 4 as desired either extending out beyond the wind shield as shown in Fig. 12, the position it will occupy when in use, or retracted within the confines of the wind shield as shown in Fig. 13, this being its position when not in use. To effect this sliding movement, the extension member 32 is attached to the channel member 33, the flanges of which are turned toward each other and seat in guides formed in the upper and lower sides of strip 7 of the main shade member 4. The part 32 is of the same material as strip 6 and may have observation spaces or sections in the same manner. An extension 34 is attached to the shade 4 in this modification and its free end has engagement with groove 35 in the wind shield frame, whereby when the extension for the shade is in outer position, the wind pressure that will be exerted against it will not cause the shade as a whole to fly backward or vibrate unduly as would be the case if no provision were made to overcome it.

I have fully described complete and practically operative embodiments of my invention and have indicated some applications thereof. It is to be understood, however that while of great value and utility as applied to automobiles, locomotives, boats, etc., it is not in any sense limited thereto. To those skilled in the art other instances of application, and other forms of structure will readily occur. The embodiments shown and described are accordingly to be considered only as diagrammatic and illustrative and in no respect as limiting, the invention itself including all modifications coming properly within the scope of the appended claims.

Having thus described my invention, what I claim and desire to secure by Letters Patent is:

1. In combination, a motor driven and manually guided vehicle, an adjustable light focus intercepting shade supported on the vehicle, and flexible connecting means leading from the shade to the guiding means of the vehicle whereby the shade may be manually shifted from the vehicle guiding means.

2. In a motor driven and manually guided vehicle, a wind shield, a light focus intercepting shade supported from and adjustable with respect to the wind shield, and flexible connecting means leading from the light focus intercepting shade to the guiding means for the vehicle.

3. A light focus intercepting shade, comprising a strip of material that intercepts the free passage of light, a reinforcing member located lengthwise of the strip, the main shading member extending to either side of the reinforcing member, and a plurality of observation sections in said shade.

4. A light focus intercepting shade comprising a strip of light intercepting material and a plurality of sections in said strip permitting the free passage of light.

5. In combination, a motor driven carrying vehicle adapted to be controlled in its movements by an attendant, a steering means therefor, a wind shield, a narrow light intercepting shade positioned back of the wind shield and lying in substantially horizontal position said shade serving to shield the eyes of the attendant or others from exterior lights and a connecting device interposed between the shade and the steering means.

6. In combination, a carrying vehicle adapted to be controlled in its movements by an attendant, a manually controlled adjustable light focus intercepting shade supported on the vehicle, and an extension to the shade adapted to be located within the dimensional limits of the shade or to be extended beyond the end thereof.

7. A light focus intercepting shade comprising a main or body member, and an extension thereto adapted to be located within the dimensional limits of the main or body member or to be extended beyond the end thereof.

8. In combination, a motor driven and manually guided vehicle, an adjustable light focus intercepting shade supported on the vehicle, a steering post and wheel, and means attached to the shade and leading to the foot of the steering post, thence to the wheel whereby the shade may be adjusted.

9. In combination, a motor driven and manually guided vehicle, an adjustable light focus intercepting shade supported on the vehicle, means leading from the shade whereby its adjustment may be controlled, a guiding means for the vehicle, the shade adjusting means having operative connection therewith, and means whereby the shade adjusting means may be retained within reach of the hand of the attendant of the vehicle on the guiding means.

10. In combination, a motor driven and manually guided vehicle, an adjustable light focus intercepting shade supported on the vehicle, a steering wheel, means for controlling the adjustment of the shade leading from the shade to the steering wheel, and means located on the wheel whereby the controlling means may be operated without taking the hand from the wheel.

11. In combination, a motor driven and manually guided vehicle, an adjustable light focus intercepting shade supported on the vehicle, a steering wheel, flexible connecting means leading from the shade to the steering wheel, and a roller located on the wheel around which the flexible connecting means may be turned to always keep said means within reach of the guiding hand on the wheel.

12. In combination, a vehicle, a light intercepting medium located at the front of the vehicle, said medium including a portion partially intercepting the rays of light coming thereto, means to support said medium and means to adjust said medium back and forth in a fixed transverse and vertical plane of location with reference to the body of the vehicle, said adjusting means being manually operable at will to intermittently shift said medium to and from a desired position.

13. In combination, a carrying vehicle adapted to be controlled in its movements by an attendant of a light intercepting medium supported at the front of the normal position of the attendant, said medium formed of material which partially intercepts the rays of light coming thereto, and means leading from the medium and attached thereto by which it may be manually adjusted back and forth from a desired position, for the purpose stated.

14. In combination, a vehicle adapted to be controlled in its movements by an attendant, a light intercepting medium supported on the vehicle in front of the normal driving position of the attendant, said medium comprising a member which partially intercepts the rays of light coming thereto, and means to operate the medium through a fixed transverse and vertical plane of location with respect to the vehicle back and forth from a desired position in front of the attendant.

In testimony whereof, I have hereunto set my hand in the presence of two witnesses.

WILLIS J. PERKINS.

Witnesses:
W. LE ROY PERKINS,
PETER TAYLOR.